Patented June 21, 1927.

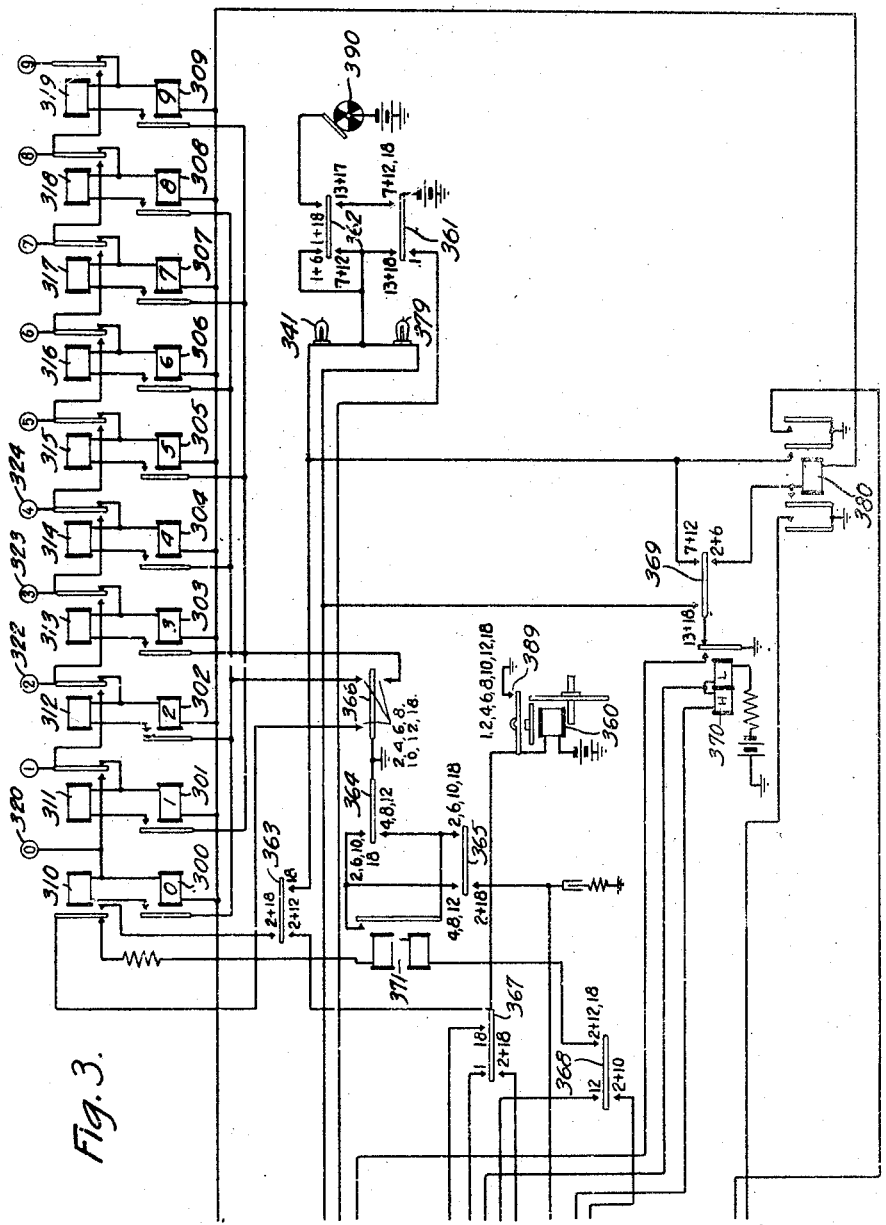

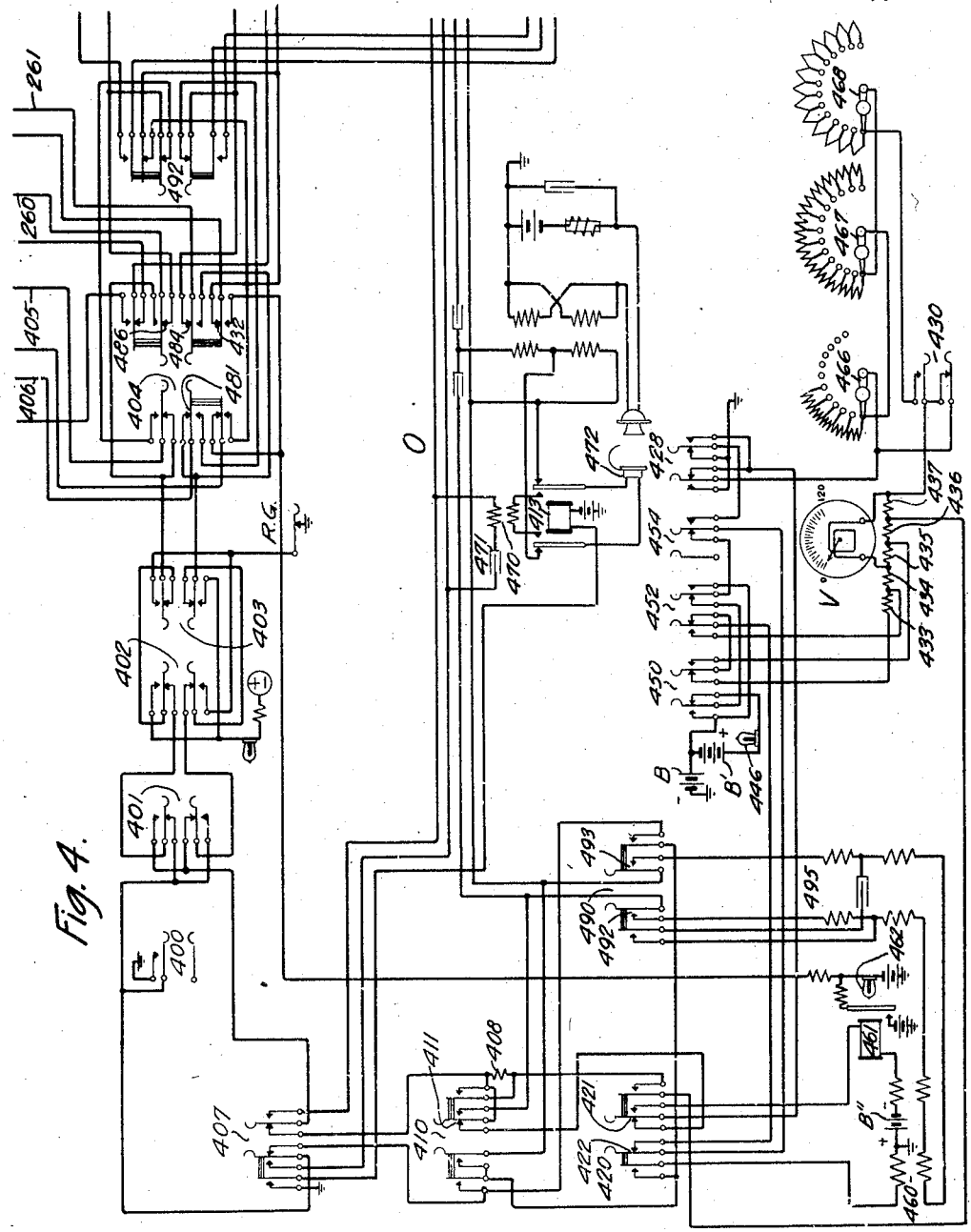

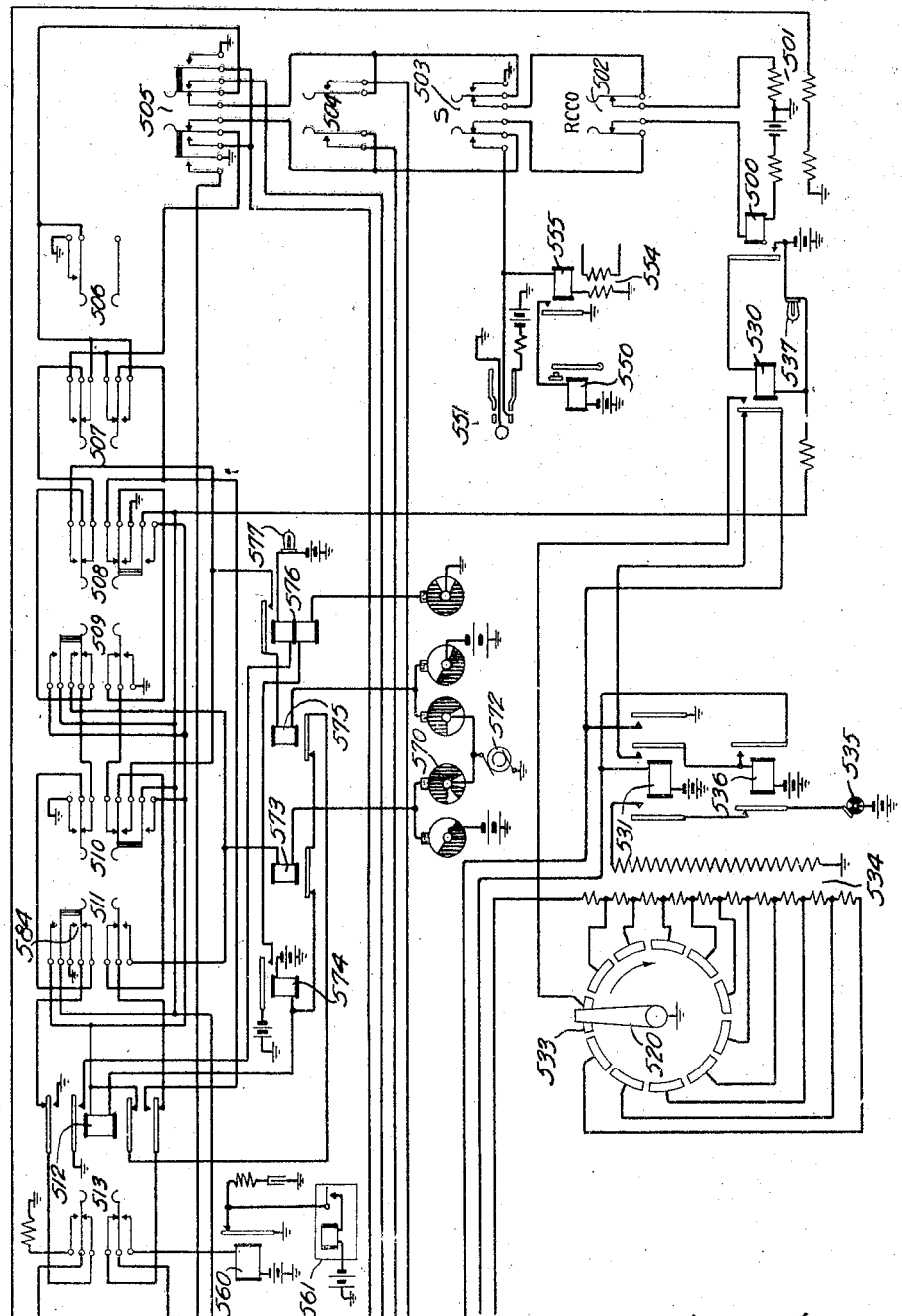

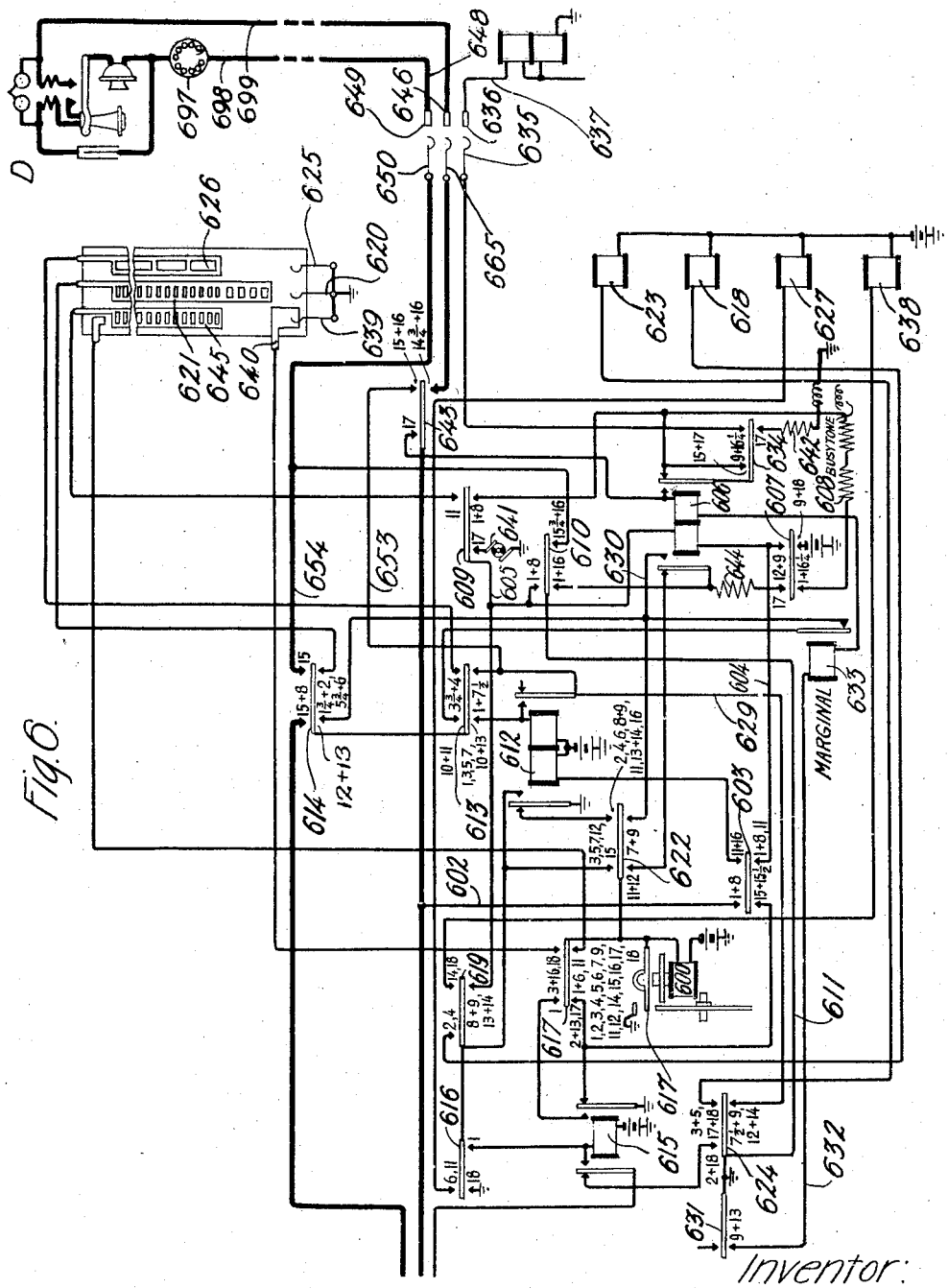

1,632,902

UNITED STATES PATENT OFFICE.

LEWIS H. JOHNSON, OF MADISON, NEW JERSEY, ASSIGNOR TO WESTERN ELECTRIC COMPANY, INCORPORATED, OF NEW YORK, N. Y., A CORPORATION OF NEW YORK.

TESTING SYSTEM.

Application filed December 29, 1922. Serial No. 609,640.

This invention relates to testing systems and more particularly to circuit arrangements for testing subscribers' lines terminating in machine switching central offices.

An object of the invention is to provide an arrangement which enables an operator at a test desk to build up, by means of machine switching apparatus, a connection to a subscriber's line of a machine switching central office and thereafter conduct routine and special tests on said line and the associated substation apparatus.

One feature of the invention consists in providing an operator's test circuit terminating in a primary and a secondary cord with means for connecting a sender to either of the cords for controlling a train of machine switches. After all switches of the train have been set the sender is automatically disconnected from the test circuit and the testing devices of the test circuit are connected in operative relationship with the line to which the test circuit has been extended by the switches.

Another feature of the invention is the provision of means incident to the directive control of an automatic switch for connecting a testing device in operative relationship with a line to be tested.

Another feature of the invention consists in providing a signal in a system of this nature for indicating to which one of a plurality of cords the sender is connected.

Another feature of the invention consists in providing signals in a system of this nature for indicating the progress of the test.

Figure 1:
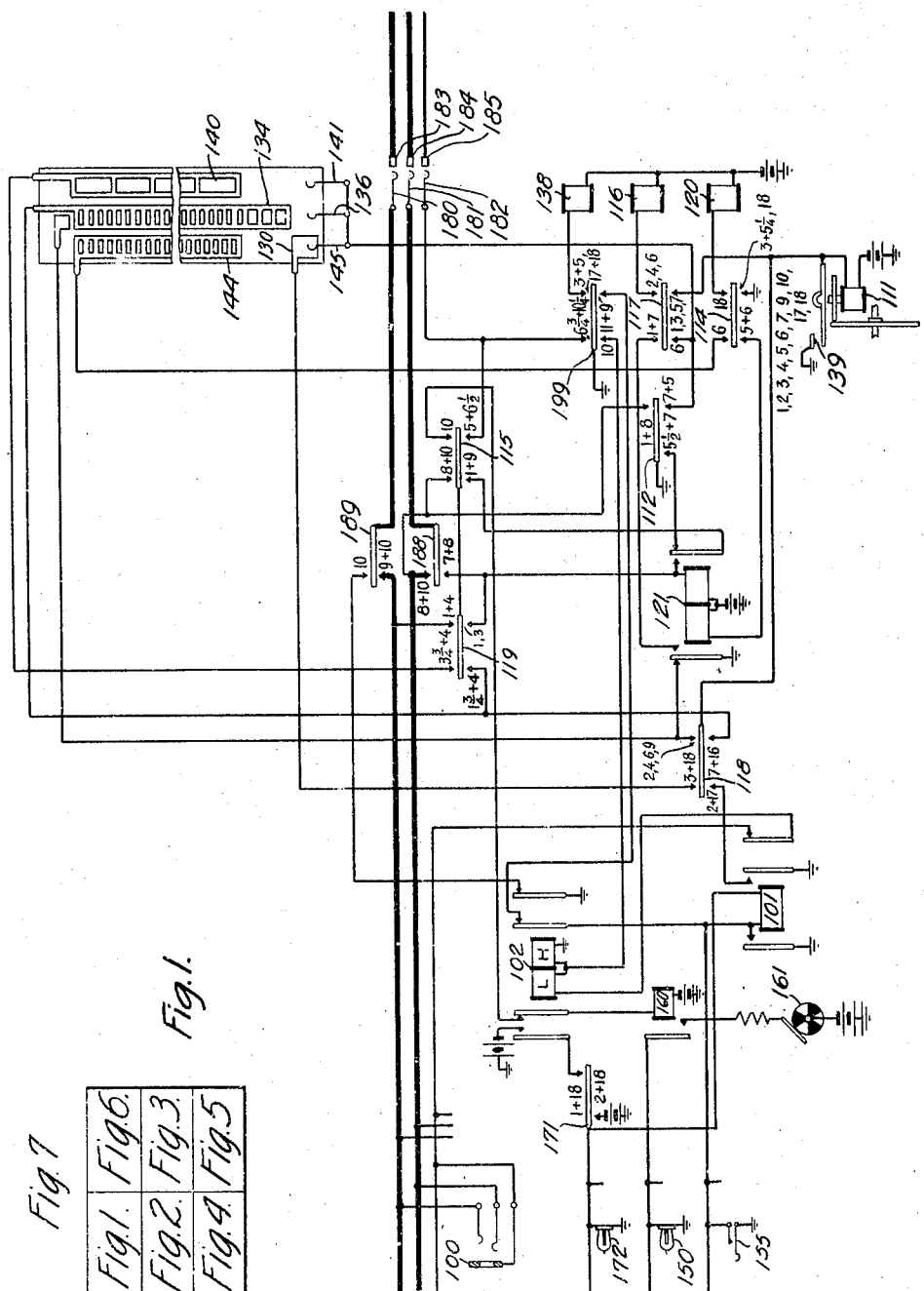
Figure 2:
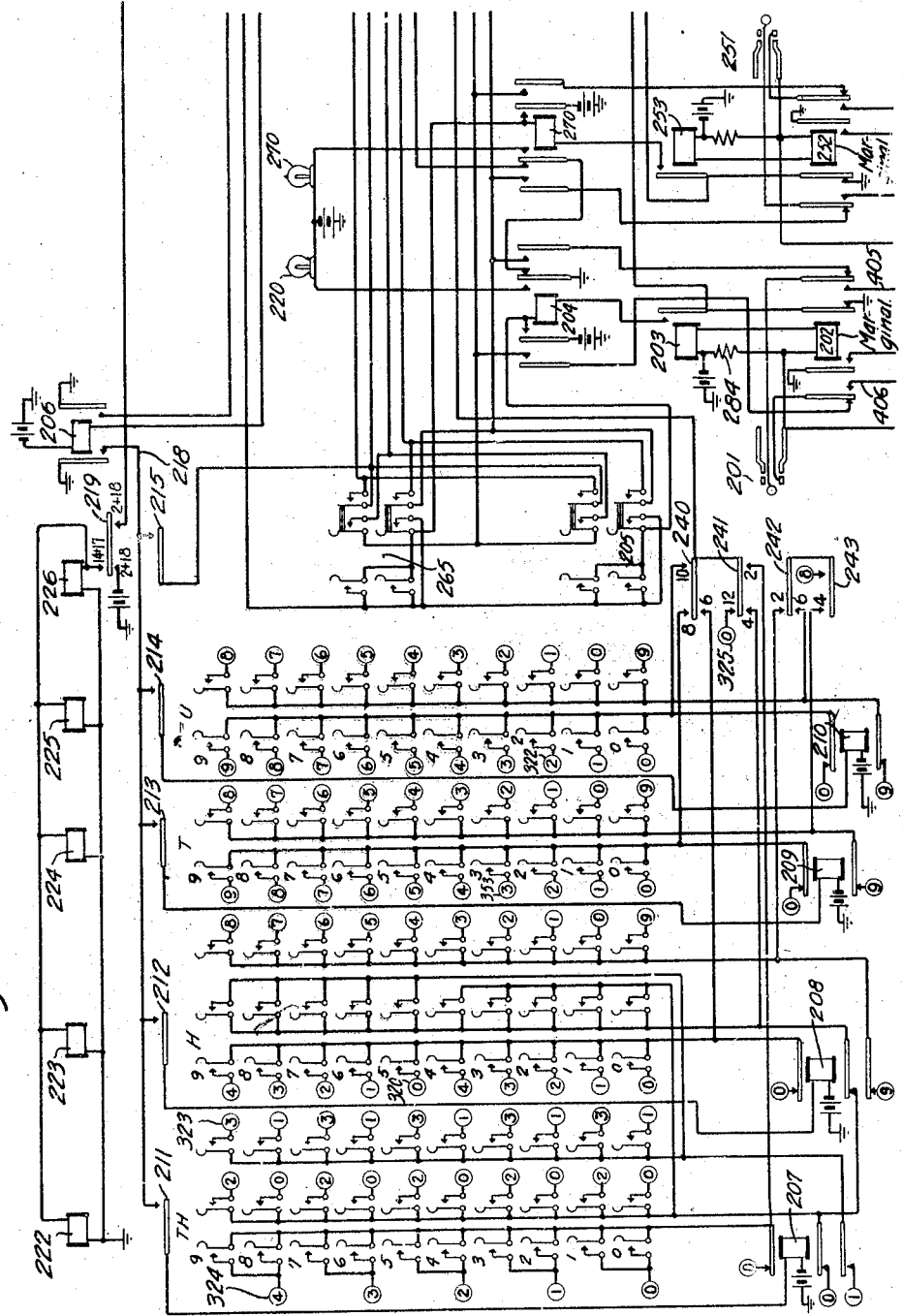

The invention may be more readily understood by reference to the following description considered in connection with the accompanying drawings in which Figs. 1 and 6 show machine switching mechanism for establishing a connection with a subscriber's line terminating in a machine switching central office and Figs. 2, 3, 4 and 5 show the circuits of the test desk for conducting various tests on the subscriber's line. Fig. 1 shows a trunk circuit terminating at one end in a jack and at the other end in a selector switch. Fig. 2 shows an operator's keyboard comprising a plurality of sets of digit keys for recording the numbers of subscriber's lines to be tested, a primary and a secondary test cord and a pair of keys for each of said cords. Fig. 3 shows a portion of a circuit of a sending mechanism comprising a stepping relay, a group of counting relays and a sequence switch for controlling the circuits of the sender. Figs. 4 and 5 show various keys which are under the control of the operator at the test desk, a volt meter, a variable rheostat and howler and ringing equipment. Fig. 6 shows the mechanism and circuits of a final selector switch and the line of a subscriber to which the final selector switch has access. Fig. 7 is a diagram showing the manner in which the several sheets of the drawing should be arranged to show as much of a complete organization of circuits as is necessary to illustrate the manner in which various tests of the subscribers' lines may be made.

*Description of apparatus.*

The test selector and final selector diagrammatically disclosed in Figs. 1 and 6 are of the type shown and described in the patent to E. B. Craft and J. N. Reynolds No 1,123,696, issued January 5, 1915. Each of the switches has a vertically disposed switch shaft (not shown) provided with five sets of brushes, each brush having access to a bank of one hundred terminals. For driving the brushes upwardly, an updrive magnet is provided, which when energized, presses the switch shaft against a constantly driven power drum, and for restoring the brushes to normal position, a second downdrive magnet is provided, which when energized, presses the switch shaft against a second constantly driven power drum. For determining the particular set of bushes on the switch shaft to be employed, a tripping spindle (not shown) is provided as described in the patent heretofore referred to. The final selector switch differs from the other selector switches in being provided with additional means comprising a second updrive magnet and driving drum for driving the switch shaft upwardly at two different speeds, rapidly during brush selection and group selection and more slowly during the terminal selection movement of the switch shaft.

For controlling the circuits associated with the several selector switches and the circuits of the sender, auxiliary switches are provided. These switches may be of the type described in the patent to Reynolds et al., No. 1,127,808, filed February 9, 1915 and known in the art as sequence switches. Each sequence switch comprises a rotatable shaft driven from a constantly operated source of power through a magnetic clutch member and carries a plurality of circuit closing cams, which at different positions of the shaft, cause the closure of a plurality of contacts. The cam contacts associated with each sequence switch are closed only in the positions indicated by the numerals associated with each contact with exception of the master contacts 139, 389 and 617 associated respectively with sequence switches 111, 360 and 600, these latter contacts being opened in the positions indicated by the numerals appearing adjacent such contacts and closed in all other positions.

For enabling the testing operator to conduct routine and special tests, testing equipment as shown in Figs. 2, 3, 4 and 5 is provided. The routine tests are required generally to ascertain whether the subscriber's lines are devoid of "shorts", "grounds" and "crosses with the central office battery or foreign E. M. F.", that the capacity of the lines is correct and that the insulation resistance of the lines is satisfactory. These tests are usually made as a matter of routine. Among the devices employed in making such tests are a test battery comprising batteries B and B', a volt-milliammeter and various keys. Among the special tests conducted by the testing operator are what are hereinafter termed howler test, sounder test and adjustment of the subscribers' bells. These tests, as a rule, are only made when trouble on a line has been reported. This equipment may be associated with either one of two test cords, one of which is termed a primary test cord and the other a secondary test cord. In the primary test cord which terminates in plug 201, are grouped those testing devices which are necessary for making the routine tests and certain other tests inseparably associated with the use of a volt-milliammeter. In the secondary test cord, which terminates in plug 251, are grouped those testing devices which do not involve the use of a volt-milliammeter. By means of a test cord interchange key 404, the primary and secondary test circuits can be interchanged with respect to their plugs. This arrangement enables a testing operator to employ his time more efficiently since those tests, such as howler, sounder and adjustment of subscribers' bells, which are apt to consume considerable time are associated with a separate circuit. This arrangement also enables the testing operator to make routine tests on one line connected to the primary test circuit and to conduct special tests on another line connected to the secondary test circuit at the same time.

The testing combination intended primarily for determining the character of trouble consists of a 100-volt battery poled opposite to the central office battery having a 20-volt tap. In Fig. 4 of the drawings the 100-volt battery includes batteries B and B', the former being a 20-volt tap. The volt-milliammeter has the following scale: 0 to 120 volts 100,000 ohms, 0 to 24 volts 20,000 ohms, 0 to 24 volts 1,000 ohms, also reading 0 to .024 amperes and 0 to .480 amperes. The 100 volt test battery is used in connection with the 100,000 ohm 120 volt scale, while a tap from this battery to give 20 volts is used with the 20,000 ohm 24 volt scale and the 1,000 ohm 24 volt scale. The milliammeter is used in connection with the central office battery when making resistance measurements. By having the full scale deflection of the volt-milliammeter register 120 volts and by having the test battery poled opposite to the central office battery, the testing operator is enabled to quickly detect crosses with the latter battery in that the reading will be in excess of 100 volts by an amount equal to the voltage of the central office battery.

The howler apparatus includes a revolving member 520 which may be moved off normal by hand and which then restores automatically. Such devices are well known as, for example, shown in Patent No. 1,155,640, of October 5, 1915, to G. Brown.

For testing the dials at the substation, a dial tester is schematically shown within the rectangle on Fig. 5 of the drawings. This apparatus may be of the type shown and described in Patent No. 1,391,947, of September 27, 1921, to E. W. Gent.

*Description of operation.*

The testing operator may conduct a test either over the primary test cord terminating in plug 201, or over the secondary cord terminating in plug 251. Insertion of plug 201 into the jack of the trunk and actuation of the start key 205 causes the sender to be connected to the primary test cord, and lamp 220 to be lighted during such connection, whereas, insertion of the secondary test plug 251 into jack 100 and actuation of the start key 265 causes the sender to be connected with the secondary test cord and lamp 270 to be lighted during such connection.

Let it be assumed that the testing operator desires to use the primary test cord to test the line of the subscriber whose number is 9532. The testing operator will insert the plug 201 of the primary test cord into the pack 100 of the selector circuit and then record the number of the line to be tested upon the keyboard. The operator then depresses the start key 205 whereupon a circuit is completed over a path extending from ground, through the right and left hand windings of relay 102, outer right hand contacts of relay 101, sleeve of jack 100, sleeve of plug 201, and thence in parallel, one path extending through the resistance 284 to grounded battery, and the other path extending through the windings of relays 202 and 203 in series to grounded battery. Relay 102 operates in this circuit and completes a circuit through its outer left hand contacts and the upper right hand contacts of sequence switch spring 171, for lamp 172, The lighting of lamp 172 and multiples thereof indicate that the trunk is busy. Relay 202 is of the marginal type and will not operate in series with the right and left hand windings of relay 102. Relay 203 operates, however, in this circuit. The actuation of key 205 together with the operation of relay 203 completes a circuit for relay 204 over a path extending from ground, through the inner right hand contacts of relay 202, contacts of relay 203, winding of relay 204, inner right hand contacts of key 205, and thence to the grounded battery at the contact of sequence switch spring 361 (1). Relay 204, in operating, locks independently of the sequence switch spring 361 over a path extending from grounded battery, through the inner left hand contacts of relay 204, winding of relay 204 and thence to ground at the inner right hand contacts of relay 202. Relay 204, in operating, completes an obvious circuit through its inner right hand contacts for lamp 220. The lighting of this lamp indicates that the primary cut in relay 204 has operated. Relay 204, in attracting its outer left-hand armature, also completes a circuit for relay 370 over a path extending from ground, through the upper right hand contact of sequence switch spring 112 (1+8), ring of jack 100, ring of plug 201, outer left hand normal contacts of relay 202, outer left hand contacts of relay 204, left and right hand windings of relay 370 to grounded battery. Relay 370, in operating, completes a circuit for relay 206 over a path extending from grounded battery, through the winding of relay 206 and the alternate contacts of relay 370 to ground. Relay 206 operates in this circuit and connects through its left hand contact, ground to the relays 207, 208, 209 and 210 through the contacts 211, 212, 213 and 214 respectively which are mechanically closed by the operation of any key of the thousands, hundreds, tens and units set of keys. Relay 206, in operating, also completes a circuit for lamp 379 over a path extending from ground, through the inner right hand contacts of relay 206, lamp 379, upper left hand contact of sequence switch spring 362 (1+6), upper right hand contact of said spring (1+18) and through interrupter 390 to grounded battery. The connection of lamp 379 to the interrupter 390 causes lamp 379 to flash. This lamp continues to flash during the selection of the desired line. The flashing of the lamp indicates to the operator that the sender is functioning properly. Relay 206, in operating, also completes a circuit for driving sequence switch 360 from position 1 to position 2, said circuit extending over a path including ground, left hand contacts of relay 206, contact 215, upper left hand contact of sequence switch spring 367 (1), and grounded battery at the magnet winding of sequence switch 360.

With sequence switch 360 in position 2, a fundamental circuit is now established extending from grounded battery, through the right hand winding of relay 121, lower right hand contact of sequence switch spring 119 (1), upper right hand contact of said spring (1+4), tips of jack 100 and plug 201, outer right hand normal contacts of relay 202, outer right hand contacts of relay 204, lower contact of sequence switch spring 368 (2+10), upper right hand contact of said spring (2+12), winding of stepping relay 371, left hand normal contacts of counting relay 310, and upper left hand contact of sequence switch spring 366 (2) to ground. Line relay 121 of the selector switch and the stepping relay 371 are energized in this circuit.

Relay 121, upon energizing, closes a circuit for driving sequence switch 111 out of position 1 and into position 2. This circuit extends from grounded battery, through the magnet winding of sequence switch 111, lower right hand contact of sequence switch spring 117 (1), upper left hand contact of said spring (1+7), and left hand alternate contacts of relay 121 to ground. With the selector sequence switch 111 in position 2, a circuit is now closed for the updrive magnet 116 of the selector, which circuit extends from grounded battery, through the magnet 116, upper right hand contact of sequence switch spring 117 (2), upper left hand contact of said spring (1+7), and left hand alternate contacts of relay 121 to ground. Magnet 116, upon energizing causes the upward movement of the switch shaft (not shown) in the manner well known in the art. Upon the movement of sequence switch 111 out of position 1, the initial energizing circuit of relay 121 was opened at the lower right hand contact of the sequence switch spring 119, but a locking circuit for relay 121 was closed through its right hand winding and alternate contacts, lower left hand contacts of sequence switch spring 115 (1+9), upper right hand contact of sequence switch spring 119 (1+4), and thence as traced over the fundamental circuit.

During the upward movement of the brushes of the switch, ground potential is intermittently connected to the fundamental circuit at a point of junction between the winding of the stepping relay 371 of the sender and the winding of line relay 121 of the selector. This ground potential is connected to the junction point at sequence switch spring 119 (1¾+4), through brush selection segment 134, brush 136, and thence to ground at the lower right hand contact of sequence switch spring 112 (7+5). The application of this intermittent ground potential to the fundamental circuit has no effect upon the energization of relay 121 of the selector but causes the intermittent deenergization of the stepping relay 371 in synchronism with the upward movement of the brushes of the selector.

With the sender sequence switch 360 in position 2 and relay 371 energized over the fundamental circuit, as previously traced, through the winding of relay 121 of the incoming selector switch, and with the thousands digit key No. 9 depressed, a circuit is closed upon the first energization of stepping relay 371 for the No. 4 counting relay 304, this circuit extending from grounded battery, through the lower contacts of sequence switch spring 219 (2+18), winding of lower No. 4 counting relay 304, armature and back contact of the upper No. 4 counting relay 314, lead 324, lead 324 Fig. 2 connected to the No. 9 key of the thousands set of keys, left hand contacts of said key, lower right hand contact of sequence switch spring 241 (2), lower left hand contact of sequence switch spring 365 (2+18), upper right hand contact of said spring (2), contacts of stepping relay 371, and the upper left hand contact of sequence switch spring 364 (2) to ground. Counting relay 304, upon energizing closes a locking circuit for itself extending through the winding of the upper counting relay 314, the contacts of relay 304, and the upper right hand contact of sequence switch spring 366 (2) to ground. The upper counting relay 314 does not energize at this time since its winding is shunted by a ground connected through the armature and contact of stepping relay 371. Relay 314 becomes energized however, in this locking circuit as soon as stepping relay 371 deenergizes upon the first upward step of the brushes of the selector switch. Upon the first deenergization of relay 371, through the first connection of ground to the junction point 119 of the fundamental circuit by the commutator brush 136, relay 314 energizes transferring the connection of the control lead 324 from the winding of the lower No. 4 counting relay 304 to the winding of the lower No. 3 counting relay 303, this transferred circuit extending from the lead 324 through the armature and front contact of the upper No. 4 counting relay 314, the armature and back contact of upper No. 3 counting relay 313, and thence to grounded battery through the lower No. 3 counting relay 303. Upon the second deenergization of stepping relay 371, the No. 3 counting relay 313 becomes energized and transfers the connection from control lead 324 to the lower No. 2 counting relay 302. In response to the next deenergization of stepping relay 371, the upper No. 2 counting relay 312 is energized and transfers the connection from control lead 324 to the lower No. 1 counting relay 301. Upon the next deenergization of stepping relay 371 the No. 1 counting relay 311 becomes energized and transfers the connection from control lead 324 to the lower No. 0 counting relay 300, and in response to the next deenergization of stepping relay 371 the upper No. 0 counting relay 310 is energized, closing a circuit for driving the sender sequence switch 360 out of position 2 and into position 4. This circuit may be traced from grounded battery, through the magnet winding of sequence switch 360, through the lower left hand contact of sequence switch spring 363 (2+12), upper left hand contact of said spring (2+18), front contact and armature of the upper No. 0 counting relay 310, and upper left hand contact of sequence switch spring 366 (2) to ground. Sequence switch 360, upon leaving position 2, opens the locking circuits of all counting relays which have been locked at the upper right hand contact of sequence switch spring 366 (2).

At the time that counting relay 310 energized upon completion of group selection by the selector switch, relay 121 deenergized due to the opening of the fundamental circuit at the normal contact of relay 310. This relay, upon deenergizing, opens the circuit previously traced through the up-drive magnet 116, thereby arresting the upward movement of the brushes. At its left hand armature and back contact, relay 121 closes a circuit extending through the magnet winding of sequence switch 111, upper right hand contact of sequence switch spring 118 (2) and back contact and armature of relay 121, for driving the sequence switch out of position 2 and into position 3. In position 3 relay 121 is again energized over a circuit extending from grounded battery, through its right hand winding, lower right hand contact of sequence switch spring 119 (3), upper right hand contact of said spring (1+4), tips of jack 100 and plug 201, outer right hand normal contacts of relay 202, outer right hand alternate contacts of relay 204, lower left hand contact of sequence switch spring 368 (2+10), upper right hand contact of said spring (2+12), winding of relay 371, back contact and armature of relay 310, and upper left hand contact of sequence switch spring 366 (4) to ground. Relay 121, in operating, closes a circuit for driving sequence switch 111 out of position 3 and into position 4, said circuit extending over a path including grounded battery, magnet winding of sequence switch 111, lower right hand contact of sequence switch spring 117 (3), upper left hand contact of said spring (1+7), and left hand alternate contacts of relay 121 to ground. In position 4 of sequence switch 111, the locking circuit previously traced for holding relay 121 energized, is completed over the fundamental circuit.

With sequence switch 111 in position 4 and relay 121 energized, the circuit previously traced through the updrive magnet 116 is again closed and the brushes of the switch are again driven upwardly. During the initial upward travel of the brushes the fifth set of brushes is tripped by a tripping spindle in the manner well known and during the subsequent upward movement of the switch shaft the tripped set of brushes travel in engagement with the banks with which they are associated. During the upward movement of the switch shaft an intermittent ground is connected to the junction point 119 (sequence switch spring 119) in the fundamental circuit between the winding of relay 121 and the winding of the sender stepping relay 371 over a circuit extending from the upper left hand contact of sequence switch spring 119 (3¾+4), through group selection segment 140, brush 141, and thence to ground through the lower right hand contact of sequence switch spring 112 (7+5).

The energization of the sender stepping relay 371 with sequence switch 360 in position 4 closes a circuit for the No. 3 counting relay 303, assuming that the testing operator has recorded the second digit No. 5, which may be traced from grounded battery, through the lower contacts of sequence switch spring 219 (2+18), winding of the lower No. 3 counting relay 303, back contact and armature of the upper No. 3 counting relay 313, lead 323, thence to lead 323, Fig. 2, outer right hand contacts of the No. 9 thousands key, inner right hand contacts of the No. 5 hundreds key, lower left hand contacts of sequence switch spring 241 (4), lower left hand contact of sequence switch spring 365 (2+18), upper left hand contact of said spring (4), contacts of relay 371, lower left hand contact of sequence switch spring 364 (4) to ground. Counting relay 303 energizes in this circuit and locks up in the manner previously described through the winding of counting relay 313, which relay 313 energizes on the first deenergization of stepping relay 371. In the well known manner counting relays 302, 301 and 300 are successively energized, and when the upper No. 0 counting relay 310 energizes upon the fourth denergization of stepping relay 371, or at the time the tripped set of brushes at the selector switch have been positioned upon the first set of terminals of the fourth group of terminals in the bank to which they have access, it closes a circuit at its armature and front contact for driving the sequence switch 360 out of position 4 and into position 6. This circuit may be traced from grounded battery, through the magnet winding of sequence switch 360, lower left hand contact of sequence switch spring 363 (2+12), upper left hand contact of said spring (2+18), front contact and armature of relay 310, and upper left hand contact of sequence switch spring 366 (4) to ground.

At the time counting relay 310 energizes upon the completion of group selection at the selector switch, the fundamental circuit extending through line relay 121 of the selector switch is opened, causing the deenergization of said relay 121. This relay, upon deenergizing, opens the circuit previously traced through the updrive magnet 116, thereby arresting the upward movement of the brushes of the switch. At its left hand armature and back contact, relay 121 closes a circuit extending through the magnet winding of sequence switch 111 and the upper right hand contact of sequence switch spring 118 (4), for driving the sequence switch out of position 4 and into position 5. In position 5, relay 121 is again energized by a circuit extending from grounded battery, through its left hand winding, lower left hand contact of sequence switch spring 114 (5+6), lower right hand contact of said spring (3+5¼) to ground. Relay 121 now closes a circuit extending through the magnet winding of sequence switch 111, lower right hand contact of sequence switch spring 117 (5), upper left hand contact of said spring (1+7), and front contact and left hand armature of relay 121 to ground, for driving sequence switch 111 out of position 5 and into position 6. Upon leaving position 5¼ the energizing circuit extending through the winding of relay 121 is opened at sequence switch spring 114 (3+5¼), but relay 121 remains energized over a locking circuit extending from grounded battery, through its right hand winding and alternate contacts, lower left hand contact of sequence switch spring 115 (1+9), lower right hand contacts of said spring (5+6½), and thence through the test brush 182 to ground on the test terminal of the first trunk of the group to which the brush set has been moved during the group selection movement of the brushes, if the first trunk of the group is at the time busy.

When sequence switch 111 reaches position 6 a circuit is closed for the updrive magnet 116 over the path previously traced for driving the brushes of the switch upwardly in their trunk hunting movement.

This movement will continue so long as the test brush 182 encounters ground potential on the test terminals of the trunks of the group over which this brush moves. When, however, an idle trunk is found, which, it will be assumed, is the trunk disclosed, the locking circuit of relay 121 will be opened and since the initial energizing circuit of relay 121 was opened as soon as the sequence switch moved out of position 5¼, relay 121 will deenergize, thereby opening at its left hand armature and front contact the circuit of the updrive magnet 116. To insure, however, that the brushes shall be properly centered on the terminals of the selected idle trunk, relay 121 is maintained energized to maintain the circuit of the updrive magnet 116 until the brushes are so centered, by an additional locking circuit extending from grounded battery, through the left hand winding of relay 121, lower left hand contact of sequence switch spring 114 (5+6), upper left hand contact of said spring (6), centering commutator segment 144, brush 145, and lower right hand contact of sequence switch spring 112 (7+5). It is to be noted that as soon as the brushes of the switch engage an insulating section of the segment 144 corresponding to the first idle trunk, the circuit of relay 121 is opened and this relay immediately deenergizes opening the circuit through the brush 145 and commutator segment 114 before the brush 145 can engage the conducting portion of commutator segment 144.

Upon the deenergization of relay 121 following the centering of the brushes of the switch upon the terminals of the selected idle trunk, the circuit previously traced is closed for driving the sequence switch 111 out of position 6 and into position 7.

In position 7 of sequence switch 111, a circuit is completed from grounded battery, through the right hand winding of relay 121, lower left hand contact of sequence switch spring 188 (7+8), brush 181, contact 184, conductor 602, upper left hand and lower right hand contacts of sequence switch spring 603 (1+8), conductor 604 thence by way of a parallel circuit to conductor 605, one branch of this parallel circuit extending through the left hand winding of relay 606, and the other branch extending by way of the upper right hand and lower left hand contacts of sequence switch spring 607, resistance 608 and the lower right hand contact of sequence switch spring 609, conductor 605, thence by way of the upper left hand contact of sequence switch spring 610 and conductor 611 to ground. Relay 121, in operating, completes a circuit for advancing the sequence switch 111 out of position 7 and into position 9. This circuit extends from grounded battery, through the magnet winding of sequence switch 111, lower right hand contact of sequence switch spring 117 (7), upper left hand contact of said spring (1+7), and left hand alternate contacts of relay 121 to ground. The circuit just traced for relay 121 is closed during positions 7 and 8 of the sequence switch 111 and as soon as the sequence switch is moved into position 8 and as long as the sequence switch is in position 9, a locking circuit for relay 121 is completed over a path extending from grounded battery, through the right hand winding and alternate contacts of relay 121, lower left hand contact of sequence switch spring 115 (1+9), upper left hand contact of said spring (8+10), upper left hand contact of sequence switch spring 188 (8+10), and thence over the path previously traced to ground at the final selector.

With the sequence switch 111 in position 9, a circuit is completed from grounded battery, through the right hand winding of relay 612, lower left hand contact of sequence switch spring 613 (1), upper left hand contact of sequence switch spring 614 (15+8), terminal 183, brush 180, lower left hand contact of sequence switch spring 189 (9+10), tip of jack 100, and thence over the fundamental circuit previously described to ground at the contact of sequence switch spring 366 (6). Relay 612 and stepping relay 371 are energized in this circuit. Relay 612, upon energizing, completes a circuit from grounded battery, through the winding of relay 615, lower right hand contact of sequence switch spring 616 (1), left hand armature and front contact of relay 612 to ground. Relay 615 is energized and locks over a path extending from grounded battery, through the winding and the left hand alternate contacts of relay 615, terminals 185, brush 182 and upper left hand contact of sequence switch spring 199 (6¾+10¼) to ground.

Relay 615, upon energizing, completes a circuit from grounded battery, magnet winding of sequence switch 600, upper left hand contact of sequence switch spring 617 (1) and right hand armature and front contact of relay 615 to ground, for moving sequence switch 600 out of position 1 and into position 2. It will be noted that relay 612, upon energizing, locked itself to the fundamental circuit by way of its right hand armature and front contact and the lower right hand contact of sequence switch spring 613.

Referring now to the sender circuit, the energization of stepping relay 371 completes a circuit from grounded battery, lower left hand contact of sequence switch spring 219 (2+18), lower right hand contact of said spring, winding of the No. 0 counting relay 300, lead 320, lead 320, Fig. 2, left hand contacts of the No. 5 hundreds key, lower left hand contact of sequence switch spring 240 (6), lower left hand contact of sequence switch spring 365 (2+18), upper right hand contact of said spring (6), contacts of relay 371, upper left hand contact of sequence switch spring 364 (6) to ground. The No. 0 counting relay 300 is energized in this circuit and prepares in the well known manner the circuit for the upper No. 0 counting relay 310.

With sequence switch 600 in position 2 and relay 612 energized, a circuit is completed from grounded battery, through the winding of high speed up-drive magnet 618, upper left hand contact of sequence switch spring 619 (2), left hand armature and front contact of relay 612 to ground. The brush shaft is now moved upwardly in its brush selecting movement. As the brush shaft is moved upwardly, the locking circuit of relay 612 is extended to ground by way of commutator brush 620 and commutator 621. As soon as the commutator brush engages the first selecting segment of commutator 620, stepping relay 371 is shunted down due to the closure of this circuit and allows the No. 0 counting relay 310 to operate. When commutator brush 620 engages an insulating portion of commutator 621, at which time the brushes will be accurately positioned for tripping, the holding circuit for relay 612 is broken and this relay deenergizes thereby opening the circuit of updrive magnet 618 to bring the brushes to rest, and at the same time completing a circuit from grounded battery, through the magnet winding of sequence switch 600, upper right hand contact of sequence switch spring 622 (2), left hand armature and back contact of relay 612 to ground, for moving sequence switch 600 out of position 2 and into position 3.

At the time that the upper No. 0 counting relay 310 energizes, a circuit is completed for driving sequence switch 360 out of position 6 and into position 8, said circuit extending over a path from grounded battery, through the magnet winding of sequence switch 360, lower left hand contact of sequence switch spring 363 (2+12), upper left hand contact of said spring, left hand alternate contacts of relay 310 and upper left hand contact of sequence switch spring 366 (6) to ground.

Referring now to the final switch, in position 3 of sequence switch 600, a circuit is completed from grounded battery, winding of trip magnet 623, upper left hand contact of sequence switch 624 (3+5) to ground. The trip magnet is operated in this circuit so that upon the subsequent upward movement of the brush shaft, the first set of brushes will be tripped into operative relationship with the terminals served by them. As soon as sequence switch 360 reaches position 8, the fundamental circuit is again completed over a path similar to the one just traced in connection with brush selection, and line relay 612 and stepping relay 371 are energized. Relay 612 locks up through its ring hand armature and front contact as before, and at the same time completes a circuit from grounded battery, through the magnet winding of sequence switch 600, upper left hand contact of sequence switch spring 622 (3) and left hand contacts of relay 612 to ground, for moving sequence switch 600 out of position 3 and into position 4. In position 4, the circuit of the high speed up-drive magnet 618 is again completed and the brush shaft is started upwardly.

The energization of stepping relay 371 completes a circuit for the No. 3 counting relay 303 over a path extending from grounded battery, through the lower contacts of sequence switch spring 219 (2+18), winding of the No. 3 counting relay 303, back contact and armature of the upper No. 3 counting relay 313, lead 323, lead 353, Fig. 2, left hand contacts of the No. 3 tens key, upper left hand contact of sequence switch 240 (8), lower left hand contact of sequence switch spring 365 (2+18), upper left hand contact of said spring (8) contacts of relay 371, lower contact of sequence switch 364 (8) to ground. The lower No. 3 counting relay 303 is energized in this circuit and prepares a circuit for the upper No. 3 counting relay 313. As the brushes are moved upwardly, the stepping relay 371 is intermittently shunted down as commutator brush 625 engages conducting segments of commutator 626. The fourth shunting of the stepping relay allows the upper No. 0 counting relay 310 to become energized. Relay 310, upon energizing, opens one branch of the locking circuit of relay 612 and when, a moment later, brush 625 engages an insulating segment of commutator 626, the holding circuit of relay 612 is broken and this relay deenergizes bringing the brushes to rest and the first brush set in operative relation to the fourth group of terminals served by it. The deenergization of relay 612 also completes a circuit from grounded battery, through the magnet winding of sequence switch 600, upper right hand contact of sequence switch spring 622 (4), and left hand normal contacts of relay 612 to ground, for moving sequence switch 600 out of position 4 and into position 5.

The energization of the upper No. 0 counting relay 310 also completes a circuit from grounded battery, through the magnet winding of sequence switch 360, lower left hand contact of sequence switch 363 (2+12), upper left hand contact of said spring, armature and front contact of relay 310, and upper left hand contact of sequence switch spring 366 to ground, for moving 360 out of position 8 and into position 10.

In position 5 of sequence switch 600, the fundamental circuit extending through the winding of stepping relay 371 and the right hand winding of relay 612 is again established and these relays become energized. Relay 612, upon energizing, closes the previously traced locking circuit for itself and closes the circuit for driving the sequence switch 600 out of position 5 and into position 6.

In position 6 of sequence switch 600, the circuit of low speed up-drive magnet 627 is completed extending from grounded battery, through the winding of magnet 627, upper left hand contact of sequence switch spring 616 (6) and left hand alternate contacts of relay 612 to ground. Under the control of magnet 627, the brush set is again moved upwardly.

During the upward movement of the switch shaft, an intermittent ground is connected to the junction point, (spring 613) in the fundamental circuit between the winding of stepping relay 371 and the winding of relay 612 over a circuit which may be traced from the upper right hand contact of sequence switch spring 614 (5¾+6), commutator 621, and brush 620 to ground.

The stepping relay 371 of the office sender energizing in the fundamental circuit and with the sender sequence switch 360 in position 10, a circuit is closed for the No. 2 counting relay 302 which circuit may be traced from grounded battery, through the lower contacts of sequence switch spring 219 (2+18), winding of relay 302, armature and back contact of upper No. 2 counting relay 312, lead 322, lead 322 Fig. 2, left hand contacts of the No. 2 units key, upper right hand contact of sequence switch spring 240 (10), lower left hand contact of sequence switch spring 365 (2+18), upper right hand contact of said spring (10), armature and contact of relay 371, and upper left hand contact of spring 364 (10) to ground.

In response to the successive energizations and deenergizations of relay 371, counting relays 301 and 300 energize in succession, and when the upper counting relay 310 energizes, a circuit similar to that previously traced is closed for driving a sequence switch 360 out of position 10 and into position 12. Relay 310, upon energizing opens the fundamental circuit thereby causing the deenergization of line relay 612 of the final selector switch, which in turn opens the circuit of the up-drive magnet 627 and closes the previously traced circuit for driving sequence switch 600 out of position 6 and into position 7.

As soon as sequence switch 600 reaches position 7, a circuit is completed from grounded battery, through the right hand winding of relay 612, lower left hand contact of sequence switch 613 (7), upper left hand contact of sequence switch 614 (15+8), terminal 183, brush 180, lower contact of sequence switch spring 189 (9+10), tip of jack 100 and thence over the fundamental circuit, as previously traced with the exception that the path from the right hand contact of relay 204 is directed through the right hand contact of key 205 and upper left hand contact of sequence switch 368 and thence through stepping relay 371 to ground at the sequence switch 366 (12). Relay 612 and stepping relay 371 are energized in this circuit. Relay 612 upon energizing locks over the fundamental circuit by way of its right hand armature and front contact, lower right hand contact to sequence switch spring 613 (1+7½) and at its left hand armature completes a circuit from grounded battery, through the magnet winding of sequence switch 600, upper left hand contact of sequence switch spring 622 (7), and left hand armature and front contact of relay 612 to ground. The completion of this latter circuit causes sequence switch 600 to move out of position 7 and into position 9.

At the time that stepping relay 371 energized over the fundamental circuit in series with relay 612, counting relay 300 operated over a path extending from grounded battery, lower contacts of sequence switch spring 219, winding of counting relay 300, leads 320, lead 325 Fig. 2, upper left hand contacts of sequence switch spring 241 (12), lower contact of sequence switch spring 365 (2+18), upper left hand contact of said spring (12), contacts of relay 371, lower contact of sequence switch spring 364 (12) to ground. When sequence switch 600 moves out of position 7 stepping relay 371 releases, removing ground from lead 320 allowing counting relay 310 to operate over its locking circuit in the well known manner. Relay 310 in operating, completes a circuit for moving sequence switch out of position 12 and into position 18 over a path traced from grounded battery, through the magnet winding of sequence switch 360, lower left hand and upper contacts of sequence switch spring 363, alternate contacts of relay 310 to ground at the upper left hand contact of sequence switch spring 366.

When sequence switch 600 reaches position 7½, the locking circuit of relay 612 is maintained by way of conductor 629 and the lower right hand contact of sequence switch spring 624 to ground so that this relay remains energized after its original locking circuit is broken at the lower right hand contact of sequence switch 613. When sequence switch 600 leaves position 8, the locking circuit for relay 121 of the selector switch is opened at sequence switch spring 603 (1+8) and it releases.

When sequence switch 600 reaches position 9 a circuit is completed from grounded battery, through the right hand contacts of sequence switch spring 607, left hand winding of relay 606, lower right hand contact of sequence switch spring 619 (8+9), left hand armature and front contact of relay 612 to ground. Relay 606 is energized in this circuit and completes a circuit from grounded battery, through the magnet winding of sequence switch 600, lower right hand contact of sequence switch spring 622 (7+9), conductor 630, left hand armature and front contact of relay 600, lower left hand contact of sequence switch spring 610 (1+16) to ground, for moving sequence switch 600 out of position 9 and into position 11.

It is to be observed that as soon as test relay 606 was energized, it completed a locking circuit for itself from ground, through the lower left hand contact of sequence switch spring 631, conductor 632, winding of test relay 633, right hand winding of relay 606, right hand armature and front contact of relay 606, upper right hand contact of sequence switch spring 634 (9+16¼), test brush 635, test terminal 636, conductor 637 to grounded battery, provided the called line is busy. The grounded battery is associated with the test terminal 636 from the final selector associated therewith.

Let it be assumed for the following description that the final selector brush members 635, 665 and 650 have been associated with a busy line such as represented. Relay 606 remains operated through its right winding over a circuit from ground through the lower contact of sequence switch spring 631, winding of relay 633, right winding and contact of relay 606, right upper contact of sequence switch spring 634, brush 635 and thence to battery over the sleeve conductor of the final selector encountered at such busy connection. Relay 633 is operated in the circuit traced to cause the release of relay 612. A circuit is thus established to rotate the sequence switch from position 11 to position 12. This circuit may be traced from battery through the winding of magnet 600, right upper contact of sequence switch spring 622 to ground through the left contact of relay 612.

With the sequence switch in position 12 a circuit is established to reoperate relay 612 from battery, through its right winding, left lower contact of sequence switch spring 613, left lower contact of sequence switch spring 614, left contact of relay 606, left lower contact of sequence switch spring 610 to ground at sequence switch spring 624. A locking circuit is established for relay 612 from battery through its right winding and right contact to ground through the right lower contact of sequence switch spring 624. The operation of relay 612 establishes a circuit from ground through its left contact, left upper contact of sequence switch spring 622, winding of magnet 600 to battery to rotate the sequence switch out of position 12. Since the master sequence switch spring 617 is not cut in position 13, the sequence switch will rotate through this position to position 14.

In sequence switch position 14 the downdrive magnet is energized to restore the switch brushes to normal. The downdrive magnet 638 is energized over a circuit from battery through its winding, right upper contact of sequence switch spring 619 to ground through the left contact of relay 612. When the selector switch brushes have been restored to normal, brush 639 is brought into contact with commutator 640 which establishes a circuit to further rotate the sequence switch into position 17. This circuit is from ground through brush 639, commutator 640, right upper contact of sequence switch spring 617, magnet 600 to battery. The rotation of the sequence switch from positions 13 to 14 opens the energizing circuit for relays 633 and 606 to cause their release. The rotation of the sequence switch from position 14 to position 17 opens the holding circuit for relay 612 to cause its release.

In sequence switch position 17 interrupter 641 is associated with test relay 606 and a circuit is thus established to cause relay 606 to intermittently energize and deenergize. This circuit may be traced from ground through the segments of constantly rotating interrupter 641, left lower contact of sequence switch spring 609, left winding of relay 606, right contacts of sequence switch spring 607 to battery. Each operation of relay 606 associates a grounded tone source with the ring talking conductor which energizes the supervisory relay 500 in the wire chief's desk circuit. The circuit for energizing relay 500 may be traced from ground through resistance 642, lower contact of sequence switch spring 634, right contact of relay 606, left upper contact of sequence switch spring 643, brush 184, left upper contact of sequence switch spring 188, ring spring of jack 100, ring contact of plug 251, assuming that this plug is the one inserted in jack 100, right outer front contact of relay 252, contact 484 of key 404, lower inside contact of key 513, lowermost normal contact or relay 512, lower inside contact of keys 511, 510, 509, 508, 507, 505, 503 and 502, winding of relay 500, left upper winding of coil 501 to battery. Each operation of relay 606 energizes relay 500 and the release of relay 606 causes the release of relay 500. A circuit is thus established to intermittently light lamp 537 from battery, through its filament, contact 432 of key 404 to ground through the right inner contact of relay 252.

The wire chief upon noting the intermittent illumination of lamp 537 removes plug 251, from jack 100 to cause the release of the selector switch, Fig. 1, which restores to normal as hereinafter described. The circuit for relay 615 is thus opened to cause its release which establishes a circuit from ground through its right contact, left lower contact of sequence switch spring 617, winding of magnet 600 to battery. The sequence switch of Fig. 6 is thus rotated from position 17 to position 18. A circuit is established in position 18 to rotate the sequence switch to its normal position 1. This circuit may be traced from ground, through brush 639, commutator 640, right upper contact of sequence switch spring 617, winding of magnet 600 to battery.

Assuming now, that the called line is a direct line and that it is idle, no potential is supplied to test terminal 636 and therefore relay 606 is not maintained energized nor is relay 633 caused to energize. Relay 606 thereupon deenergizes and completes a circuit from grounded battery, through the magnet winding of sequence switch 600, lower left hand contact of sequence switch spring 622, left hand armature and back contact of relay 606, and lower left hand contact of sequence switch spring 910 (1+16) to ground, for moving sequence switch 600 from position 12 and into position 14. It is to be noted that as soon as sequence switch 600 leaves position 9 upon the energization of relay 606, the locking circuit for relay 612 is broken. Therefore as soon as sequence switch 600 reaches position 14 it will be immediately moved out of position 14 due to the completion of a circuit from grounded battery, through the magnet winding of sequence switch 600, upper right hand contact of sequence switch spring 622, left hand armature and back contact of relay 612, to ground. The completion of this circuit moves sequence switch 600 out of position 14 and into position 15, which is the talking position. As soon as the final selector switch passes out of position 14½, the locking circuit previously traced for relay 121 of the selector is opened, whereupon said relay 121 releases. Relay 121, in retracting its left hand armature completes the circuit previously traced from driving sequence switch 111 from position 9 into position 10, which is the position in which the various tests on the called line are made. In position 10 of sequence switch 111, the right hand winding of relay 102 which is high wound is shunted by a direct connection to ground, through the lower left hand contact of sequence switch spring 199 (10). Marginal relay 202 associated with the primary test cord now obtains sufficient current to permit of its energization.

With relay 202 energized, the tip and ring conductors 405 and 406 associated with the key 404 of the test cord are extended to the tip and ring conductors of the plug 201. Relay 202, in attracting its inner right hand armature, opens the locking circuit for relay 204 causing the release of relay 204. Relay 204, in retracting its inner right hand armature, extinguishes lamp 220 and completes a circuit for moving sequence switch 360 out of position 18 and into position 1, said circuit extending over a path from grounded battery, through the magnet winding of sequence switch 360, lower left hand contact of sequence switch spring 367 (2+18), inner left hand normal contacts of relay 270 and the inner right hand normal contacts of relay 204 to ground. When sequence switch 360 moves out of position 12 the flashing circuit including interrupter 390 and outer right hand contacts of relay 206 for lamp 379 is interrupted at sequence switch spring 362, but as soon as it moves into position 13, and until it moves out of position 18, another circuit is completed through the upper left hand contacts of sequence switch spring 361 (13+18) and 369 (13+18) and contacts of relay 370 causing lamp 379 to light steadily, this steady signal indicates to the operator that the selection is completed. As sequence switch 360 moves into position 14, magnets 222 to 225, inclusive, associated with the thousands, hundreds, tens and units keys and magnet 226 associated with the start key 205 are energized causing in the well known manner the restoration of these keys to normal position. The circuit for the energization of these magnets may be traced as follows: from grounded battery, through the lower left hand contacts of sequence switch spring 219 (2+18), upper left hand contacts of said spring (14+17) and thence by divided path, one path extending through the winding of magnet 226 to ground and the other path extending through the windings of magnets 222, 223, 224 and 225 in parallel to ground.

*Tests with primary cord circuit.*

To conduct a routine test, the operator actuates ground key 400 thereby connecting ground to the tip side of the subscriber's line over a path extending from ground, through the contacts of key 400, upper normal contacts of reverse key 401, upper normal contacts of key 402, upper normal contacts of key 403, upper normal contacts of key 404, conductor 405, outer right hand alternate contacts of relay 202, tips of plug 201 and jack 100, lower left hand contact of sequence switch spring 189 (9+10), brush 180 and terminal 183, upper left hand contact of sequence switch spring 614 (15+8), upper right hand contact of said spring (15), brush 650 and terminal 649 and thence to the tip conductor 698 of the called station D.

The voltmeter V and the batteries B and B' are then connected in series with the ring side of the line over a path extending from ground through batteries B and B', lamp 446, left hand normal contacts of key 450, right hand normal contacts of key 452, normal contacts of key 454, contacts 422 of key 420, left hand normal contacts of key 452, right hand normal contacts of key 450, through windings 433 and 434 of the voltmeter V, normal contacts of key 430, left hand normal contacts of key 428, contacts 421 of key 420, contacts 411 of key 410, right hand normal contacts of key 407 lower normal contacts of key 402, lower normal contacts of key 403, contacts 481 of key 404, conductor 406, outer left hand alternate contacts of relay 202, rings of plug 201 and jack 100, upper left hand contact of sequence switch spring 188 (8+10), brush 181, terminal 184, lower right hand contact of sequence switch spring 643, (14¾+16), brush 665, terminal 646, and thence to the ring conductor 699 of the called station.

The operator then actuates the reverse key 401. When this key is actuated there will be a deflection of the needle of the voltmeter V. The amount of the deflection of the needle of the voltmeter is then a measure of the capacity across the line including the substation apparatus at D. When the needle comes to rest it measures in parallel the resistance between the two sides of the line and between the tip side of the line and ground, the amount of deflection indicating whether a short, ground or the insulation resistance is being measured. If the needle comes to rest so as to give a deflection in excess of 100 volts it indicates that the tip sides of line is probably crossed somewhere with the office battery.

The reverse key 401 is then restored to normal. There will be a deflection of the needle of the voltmeter such deflection being the measure of the capacity across the line including the substation apparatus. When the needle comes to rest it measures in parallel the resistance between the two sides of the line and that between the ring side of the line and ground, the amount of the deflection indicating whether a short or a ground or the insulation resistance is being measured. If the needle comes to rest so as to give a deflection in excess of 100 volts it indicates that the ring side of the line is probably crossed with the office battery.

The operator then restores the ground key to normal position. Generally the test operator pays little attention to the reading of the voltmeter upon this movement of the key. From the foregoing it is obvious that the second and third movements of the reverse key are the important ones. If the positions of the needle, when in its deflected position and in its normal position are satisfactory it indicates that the called line is in a normal condition. Of all tests made on the subscriber's lines, approximately 90% of the tests show the lines to be in normal condition, so that it is evident that from the foregoing tests, that the testing operator is enabled to verify this fact in a simple and quick manner. It is also evident that if the testing operator's work is such that he can leave the ground key in its operated position, only two movements of the reverse key are necessary in order to verify that a line is in normal condition. If the "at rest" position of a needle is not satisfactory further tests are made to obtain a more definite idea of the nature of the trouble. By leaving the ground key in its normal position and by operating and restoring the reverse key the testing operator is enabled to detect whether the trouble is a "short" or "ground" on the tip, a "ground" on the ring, or a combination of these troubles, by reference to his chart which shows various deflections of the needle for various kinds of trouble.

*Volt-milliammeter scale change keys.*

If the testing operator wishes to obtain some further idea of the size of the "short" or "ground", he operates the scale change key, which connects that winding of the volt-milliammeter into circuit most clearly equal in resistance to that of the short or ground to be measured for, as already mentioned, the reading of the volt-milliammeter is most accurate when its winding is equal to that of the resistance to be measured. The scale change key 452 when operated connects the 20 volt test battery and the 0-24 volt 20,000 ohm windings 434 to 437, inclusive, of the volt-milliammeter in circuit. The scale change key 450 when operated connects the 20 volt test battery and the 1,000 ohm windings 436 and 437, of the volt-milliammeter in circuit. The key 420 when operated connects the 24 volt battery B", to one winding of the repeating coil 460, the supervisory relay and the 0-.480 ampere winding 437 of the volt-milliammeter in circuit.

*Measurement of foreign potentials and voltage of test batteries.*

If the testing operator wishes to obtain more definite information regarding the voltage of an external source of potential, shown by the routine tests to be crossed with the subscriber's line, he operates the foreign E. M. F. key 454 and when necessary the voltmeter reverse key 428. These keys also permit the testing operator to measure earth potentials. The foreign E. M. F. key 454, when operated, disconnects at its normal contacts the 100 volt and 20 volt test batteries from the windings of the volt-milliammeter and instead connects thereto through its alternate contacts a ground. The voltmeter reverse key 428, when operated, reverses the windings of the volt-milliammeter with respect to the line. The reverse key must be used when the external potential is of such polarity as to cause the needle to tend to deflect off the scale in a reverse direction. Because of the fact that 0-120 volt scale of the volt-milliammeter has a very high resistance, earth potentials can be measured with considerable accuracy even if there be a few thousand ohms resistance in the external circuit. The 20,000 ohm windings 434 to 437, inclusively, and 1,000 ohm windings 436 and 437 of the volt-milliammeter are also available for use in making measurements of external potentials. The circuit arrangement is also such that if the voltmeter reverse key 428 only, is operated the voltage of the 100 volt test battery is observed, and if in addition the key 452 is operated the voltage of the 20 volt test battery is observed.

Talking, listening and monitoring test.

If the testing operator wishes to converse with the subscriber or trouble man on the line, he will operate simultaneously the key 420 and the key 410. Actuation of the key 420 and the key 410 connects one winding of the repeating coil and the supervisory relay 461 in series with the tip and ring talking conductors 405 and 406 of the test cord and bridges the operator's telephone set 0 across said conductors 405 and 406. The current from the source B'' then flows over the talking conductors 405 and 406 and thence over the path previously traced through the substation of the called subscriber or the apparatus of the trouble man at said station, for the purpose of supplying talking battery thereto.

For the purpose of enabling the testing operator to monitor on the circuit, a monitoring key 407 is supplied which key, when actuated causes the disconnection of the testing operator's transmitter circuit and the regular receiving circuit from the tip and ring talking conductors of the cord circuit and connects thereto the testing operator's receiver through a high efficiency monitoring repeating coil 470. It will be noted that actuation of key 407 completes an obvious circuit through its outer left hand contacts for relay 413. Actuation of key 407 also connects the secondary winding of the repeating coil 470 to the tip and ring conductors 405 and 406 of the testing operator's cord circuit. Actuation of relay 413 connects the operator's receiver 472 in operative relationship with the secondary winding of the coil 470 so that the testing operator may listen in on the line of the station D.

Transmission test.

Transmission tests of subscribers' lines are made before substations are put into service and in connection with the investigation of transmission complaints. This test embodies the following features: The use of an adjustable artificial substation line for reducing the current through the transmitter on the subscriber's loop under test to a definite value which will be the same for tests on all loops and thus by equalizing current supply losses on the different loops tested, produce a fairly uniform testing condition and one which will permit of a definite loop condition being used as a basis of comparison: the employment of an artificial trunk line to be connected in circuit between the trunk side of the repeating coil supplying current to the substation loop and the testing operator's talking set. The purpose of this artificial trunk is to increase the total transmission equivalent of the testing circuit to about 30 miles of standard cable thus representing the transmission to be obtained on a typical toll or long distance connection. In addition, it is the general experience that small differences in the volume of transmission can be more readily detected where the transmission equivalent is in the neighborhood of 20 or 30 miles in a talking test between the testing operator and the installer or trouble man at the substation. This test should render it possible to discover defects which would cause any serious transmission loss. For equalizing the current supply to the different substations, a variable resistance rheostat is provided which has three dials. By the rotation of the dial handle 466, resistance from 0 to 50 ohms may be connected into the circuit by approximately 2½ ohm steps. By the rotation of the dial handle 467, resistance from 0 to 500 ohms may be connected into circuit by 25 ohm steps. In order to increase the range of the rheostat when used for other purposes as described later a third dial handle 468 is provided by means of which an additional 2,500 ohms may be connected in circuit by 500 ohm steps. The rheostat is normally disconnected from the test circuit but it may be connected by operating key 430.

When making a transmission test the operator actuates key 490 thereby connecting the testing operator's telephone set 0 through contacts 492 and 493 of the key, to the artificial cable 495, which is in turn connected to the lower winding of the repeating coil 460. Key 420 is then actuated to connect the primary winding of coil 460 in circuit with station D. The testing operator then actuates key 430 and adjusts the rheostat until the needle of the volt-milliammeter indicates that .040 amperes is flowing out over the subscriber's loop which it is assumed in this case corresponds to a standard loop. By building out the substation loop in this manner and by introducing the artificial cable the transmission takes place over a circuit approximating 30 miles of standard cable.

*Tests using secondary test cord.*

When the operator conducts the special tests hereinbefore mentioned, the secondary test plug 251 is employed. Insertion of this plug into jack 100 and actuation of the start key 265 associated therewith, causes the connection of the sender to plug 251. Relays 252, 253 and 270 associated with the secondary test plug 251 correspond to relays 202, 203 and 204 respectively, associated with the primary test plug 201 and it is believed that a detailed description of the operation of these relays is unnecessary. Marginal relay 252 operates to disconnect the sender from the secondary test cord when selection is completed and lamp signal 379 lights steadily to indicate this to the operator.

*Howler test.*

It often occurs that at subscribers' stations the receiver is unintentionally left off the hook. This causes trouble at the central office. In order to call the attention of the subscriber, a tone hereafter termed a "howler tone" is connected to the subscriber's line. Assuming that the subscriber at station D has left the receiver off the switchhook and that the testing operator has by means of the secondary test plug 251 established a connection with the line of the subscriber at station D, the testing operator will next actuate the howler key 492, after which, he will actuate the movable member 520. With the receiver at station D off the switchhook, relay 500 will be actuated over a circuit extending from grounded battery, through the upper left hand winding of repeating coil 501, winding of relay 500, left hand contacts of key 502, left hand normal contacts of key 503, inner left hand normal contacts of key 505, lower normal contacts of key 507, inner lower normal contacts of key 508, lower normal contacts of key 509, inner lower normal contacts of key 510, inner lower normal contacts of key 511, lowermost normal contacts of relay 512, lower normal contacts of key 513, contacts 484 of key 404, conductor 261, outer right hand alternate contacts of relay 252, ring of plug 251, ring of jack 100 and thence over the heavily marked talking conductors of the selector and final connector switch and the station of the subscriber's line to the tip conductor of jack 100, tip of plug 251, outer left hand alternate contacts of relay 252, conductor 260, contacts 486 of key 404, upper normal contacts of key 513, uppermost normal contacts of relay 512, upper normal contacts of keys 511, 510, 509, 508 and 507, right hand normal contacts of keys 505, 503 and 502 and upper right hand winding of repeating coil 501 to ground. Relay 500, in operating, completes a circuit for relay 530 and lamp 531 over a path extending from grounded battery through lamp 531 and the winding of relay 530 in parallel, lowermost normal contacts of key 404 and inner right hand contacts of relay 252 to ground. Lamp 531 remains lighted as long as the receiver at station D is off the hook. Relay 530, in operating, completes a circuit for relay 531 over a path extending from grounded battery, through the winding of relay 531, lowermost contacts of key 492, alternate contacts of relay 530, segment 533 and member 520 to ground. Relay 531 in operating locks through its outer right hand contacts. With relay 531 operated a tone is connected to the right hand winding of induction coil 534 over a path extending from grounded battery, through the interrupter 535, left hand contacts of relay 536, and 531 and right hand winding of coil 534 to ground. The tone in the primary winding of coil 534 is induced in the left hand secondary winding thereof. After the testing operator actuated the howler key 492, he then actuates a lever (not shown) attached to the member 520 and as said member 520 returns to normal an increasing number of the turns of the left hand winding of coil 534 are connected in series with the secondary winding of coil 501 and a correspondingly louder tone is produced in the receiver at station D as the number of turns are increased. If the called subscriber hears the tone and restores the receiver at a station to the switchhook, relay 500 will be deenergized thereby causing the deenergization of relay 530 and the extinguishing of lamp 537. Relay 530 in retracting its armature closes a circuit for relay 536 over a path extending from grounded battery, through the winding of relay 536, inner right hand contacts of relay 531, normal contacts of relay 530 and outer right hand contacts of relay 531 to ground. Relay 536 in attracting its left hand armature, disconnects the interrupter 535 from the primary winding of the coil 534 thereby causing the ceasing of the transmission of tone to the station D, and in attracting its right hand armature closes a locking circuit for itself in parallel with relay 531. The testing operator noting the extinguishment of signal 537, restores howler key 492 to normal thereby opening the locking circuit for relays 531 and 536, causing said relays to release.

Sounder test.

The sounder is provided as an aid for locating and checking cable conductors both inside and outside the office to assist the trouble man in locating a particular wire. A source of tone 554 may be connected to the cord circuit by the actuation of key 503. In order not to interfere with the use of the secondary test cord a separate cord terminating in plug 551 is provided. If the plug 551 is inserted into jack 100, or the key 503 is operated, when the plug 251 is inserted into the jack 100, and a short circuit is placed across the line of the subscriber at station D, relay 555 will operate thereby causing the sounder 550 to be actuated to attract the attention of the testing operator.

Ringing test-adjusting subscribers' bells.

In order to signal the station D, after a connection has been established by means of the secondary test plug 251, the testing operator may actuate key 511 to connect ringing current to the station D. The actuation of key 511 completes a circuit for operating relay 574 over a path extending from grounded battery, through the winding of relay 574, contacts of relays 573 and 575, inner lower contacts of relay 512, uppermost contacts of key 511, contacts 432 of key 404 and inner right-hand contacts of relay 252 to ground. It will be noted that a path for the current also exists at this time through the winding of relay 512, but relay 512 does not energize at this time due to the shunt path just traced through the lower inner contacts of relay 512. The path for the ringing current may be traced as follows: grounded battery, through the source of ringing current 572, interrupter 570, winding of relay 573, lower alternate contact of key 511 and thence over the talking conductors of the secondary test cord, the trunk line, the final selector switch and through the loop of the station D to ground at contacts 584 of key 511. Relay 573 does not energize at this time, but when the party at station D answers, sufficient current flows therethrough to operate relay 573. Relay 573, in operating, opens the shunt circuit of relay 512 whereupon said relay 512 operates in series with relay 574. Relay 512, in operating, disconnects ringing current from station D and lights lamp 577 to indicate that the party at the station D has removed the receiver from the switchhook. The circuit for lighting lamp 577 may be traced as follows: grounded battery, through lamp 577, upper winding of relay 576, and upper inner contacts of relay 512 to ground. If the bell at station D is being tested, the trouble man thereat will adjust the bell until a proper ring is received, after which, he will inform the testing operator thereof. The testing operator will then restore the ringing key to normal position thereby causing the restoration of all ringing apparatus to normal.

Dial test.

If the test operator desires to test the dial at the station "D", key 513 will be actuated whereupon relay 560, will be connected in series with the tip and ring conductors of the called station "D" over an obvious circuit. The testing operator will then communicate with the party at station D and inform him that the dial, 697, may be actuated. As the dial returns to normal the relay 560, will be intermittently deenergized and cause the dial testing apparatus 561 to function in the manner fully described in the aforementioned patent to Gent. Upon completion of the dial test the testing operator may restore key 513 to normal and proceed to conduct any other test desired.

Restoration of apparatus to normal.

After the desired tests have been completed the testing operator will remove plug 201 or 251 from the jack 100 and actuate the disconnect key 155, whereupon relays 202 and 203 associated with the plug 201 or relays 252 and 253 associated with plug 251, and relay 102 associated with the selector release relay 101 will operate. The circuit for operating relay 101 extends over a path from ground, through contacts of key 155, winding of relay 101 and lower left hand contact of sequence switch spring 171 (2+18) to grounded battery. Relay 101, in operating, locks over an obvious circuit through its left hand contacts to ground. Relay 101 in attracting its inner right hand armature completes a circuit for driving sequence switch 111 out of position 10 and into position 18, said circuit extending over a path from grounded battery, through the magnet winding of sequence switch 111, lower left hand contact of sequence switch spring 118 (2+17) and inner right hand contacts of relay 101 to ground.

In position 18 of sequence switch 111 a circuit is completed from grounded battery, through the winding of downdrive magnet 120 and right hand contacts of sequence switch 114 to ground. The selector brush shaft is returned to its normal position under the control of magnet 120 and when its normal position is reached, a circuit is completed from ground, through the lower right hand contact of sequence switch spring 112 (7+5), brush 145, normal commutator segment 130, upper left hand contact of sequence switch spring 118 (3+18) and magnet winding of sequence switch 111 to grounded battery, for moving sequence switch 111 out of position 18 and into position 1.

As soon as sequence switch 111 leaves position 10¼, the ground which has been holding relay 615 energized is removed and relay 615 deenergizes. A circuit is then completed from grounded battery, through the left hand winding of relay 612, upper right hand and lower left hand contacts of sequence switch spring 603, right hand armature and back contact of relay 615 to ground. Relay 612 is energized and at its left hand armature and front contact completes a circuit from grounded battery, through the magnet winding of sequence switch 600, upper left hand contact of sequence switch spring 622, and left hand armature and front contact of relay 612 to ground, for moving sequence switch 600 out of position 15 and into position 16.

If the called subscriber or the test man at the station D has not replaced the receiver upon the hook at this time, relay 612, upon energizing, locks through its right hand armature and front contact by way of conductor 653, right hand contacts of sequence switch spring 643, brush 665, terminal 646, conductor 699, thence through the substation apparatus of station D returning by way of conductor 698, terminal 649, brush 650, conductor 654, and the lower right hand contact of sequence switch spring 610 to ground. The release of the final connector switch is now under control of the party at station D. When the receiver is placed upon the switchhook, relay 612 deenergizes and completes a circuit from grounded battery, through the magnet winding of sequence switch 600, upper right hand contact of sequence switch spring 622, left hand armature and back contact of relay 612 to ground for moving this sequence switch out of position 16 and into position 17 from which position it is immediately moved into position 18 due to the completion of a circuit from grounded battery, through the magnet winding of sequence switch 600, lower left hand contact of sequence switch contact 617, right hand armature and back contact of relay 615 to ground.

In position 18 of sequence switch 600 a circuit is completed from grounded battery, through the winding of downdrive magnet 638, upper right hand contact of sequence switch spring 619, lower left hand contact of sequence switch spring 616 to ground. The final selector brush shaft is returned to its normal position under the control of magnet 638 and when it reaches its normal position a circuit is completed from grounded battery, through the magnet winding of sequence switch 600, upper right hand contact of sequence switch 617, normal commutator segment 640, commutator brush 639 to ground for moving sequence switch 600 out of position 18 and into position 1.

When the sequence switch 111 of the test selector is in its testing position (10) the testing operator may withdraw the plug from jack 100 without releasing the connection. In such cases the subscriber may signal the testing operator, lamp 150 being under control of the called station at this time.

The selector switch may also be released by the simple removal of the plug 201 or 251 from jack 100 in any positions of the sequence switch 111 except the testing position. The removal of the plug releases relay 102 completing a circuit for relay 101 over a path extending from ground through the lower right hand contact of sequence switch spring 199, normal right hand contacts of relay 102, winding of relay 101 to grounded battery at sequence switch spring 171 (2+18). Relay 101 in attracting its left hand armature locks to grounded battery at sequence switch spring 171, and in attracting its right hand armature completes a circuit for the magnet of sequence switch 111 through the lower left hand contacts of sequence switch spring 118 (2+17), for driving the sequence switch 111 to position 18. In the manner previously described the selector switch is returned to normal causing in turn the release of the final connector, if it has been set. Relay 101 releases where the selector switch is moved into its normal position.

*Overflow condition.*

If an overflow condition is encountered, relay 370 will release thereby completing an obvious circuit for relay 380 which, in operation, completes a circuit for lamp signal 341 over a path extending from ground, through the normal contacts of relay 380, lamp 341, upper left contact of sequence switch spring 362 (1+6), upper right hand contact of said spring (1+18) and interrupter 390 to grounded battery. Lamp 341 is flashed in this circuit indicating to the operator, the overflow condition. The operator will thereupon release the connection in the manner heretofore described.

The selector switch shown in Fig. 1 as previously described, is of the type that hunts for an idle trunk in a group of trunks extending to selector switches such as shown in Fig. 6. When all of such trunks in a group are busy, the updrive magnet is maintained energized through the left contact of relay 121 until brushes 180, 181 and 182 are engaged with a set of overflow terminals. At this time, brush 145 is engaged with a conducting portion of overflow commutator 134. The sleeve overflow terminal is not characterized by a busy ground and the holding circuit for relay 121 is opened to cause its release. The release of relay 121 establishes a circuit to rotate the sequence switch from position 6 to position 7, by energizing magnet 111 over an obvious circuit to ground connected to the left armature of relay 121. In position 7 of the sequence switch, a circuit is again established to energize magnet 111 from grounded battery through its winding, right lower contact of sequence switch spring 118, commutator 134, brush 136 to ground through the right lower contact of sequence switch spring 112. The sequence switch now rotates from position 7 to 8 under the control of the circuit traced and from position 8 to position 9 under the control of master contact 139. A circuit is now established to energize magnet 111 to rotate the sequence switch from position 9 to position 10. This circuit may be traced from grounded battery through the winding of magnet 111, right upper contact of sequence switch spring 118 to ground through the left normal contact of relay 121.

It will be noted that upon the rotation of the sequence switch 111 from position 8 to position 9, the energizing circuit for relay 370 in the sender is opened to cause its release. It will be remembered that during the trunk hunting period of the selector switch, Fig. 1, the sender is resting in position 6 and thus when the selector switch Fig. 1, is driven to an overflow set of terminals, the release of relay 370 establishes a circuit to operate relay 380 for the purpose of flashing lamp 341 over a circuit hereinbefore described.

*Simultaneous test of a plurality of lines.*

It is apparent from the foregoing description that a plurality of lines may be successively associated with the testing circuit and simultaneously tested. To associate two lines with the testing apparatus shown in Figs. 4 and 5 plugs 201 and 251 are each inserted into a jack similar to jack 100. Let it be assumed that the selector switch associated with plug 201 is the first to be controlled by the sender, the test man will, therefore, operate key 205 in addition to the keys of the key set for controlling the selector switch. The operation of key 205 operates relay 204 and causes the sender to position selector switches, Fig. 1 and Fig. 6, upon the terminals of the line selected for test. During the period of time that the selector switches are under the control of the sender, lamp 379 is intermittently lighted over a circuit associated with interrupter 390. When the selector switches have been associated with the line to be tested, the sender apparatus is restored to normal and during the period of time between the selection of the line and the restoration of the sender apparatus, lamp 379 is lighted steadily. It will be remembered in a previous description, that relay 202 operates when the line is selected to associate the line through the selector switches and plug 201 to the testing apparatus at key 404.

When the test man observes that the selector switches associated with the plug 201 have been connected to a line and that the sender has restored to normal, the key set is again operated in accordance with the designation of the second line to be selected and the start key 265 is operated to cause the sender apparatus to function. The sender will now control a second set of selector switches, the same as Fig. 1 and Fig. 6 to associate them with a second line to be tested. When the line has been selected, relay 252 is operated to associate the line through the selector switches and plug 251 to the testing apparatus at key 404.

The tests hereinbefore described, as associated with each plug, may now be made simultaneously. It is desirable at times to make the same tests alternately on each line. This may be done by the operation of key 404 which operation reverses the relation of plugs 201 and 251 with the parts of the testing equipment, Fig. 4 and Fig. 5, including the cord circuits therein.

What is claimed is:

1. In a testing system for testing a plurality of subscribers' lines, a cord circuit, means including an automatic switch for extending said cord circuit to any of said lines, a plurality of testing devices, means for associating any of said devices with said cord circuit for testing the selected line, and means for automatically connecting said cord circuit in operative relationship with the selected line responsive to the setting of the automatic switch upon the selected line.

2. In a testing system for testing a subscriber's line, substation apparatus thereon, a cord circuit, means including a selector and a connector switch for extending said cord circuit to said line, a plurality of testing devices, means for associating any of said devices with said cord circuit for testing said substation apparatus, and means operating automatically to connect said cord circuit in operative relationship with said substation apparatus responsive to the setting of said connector switch upon the selected line.

3. In a testing system for testing a subscriber's line, an operator's test circuit having a pair of cords, a trunk circuit, a sender, a key associated with each of said cords, means responsive to the connection of one of said cords with the trunk circuit and the actuation of the key corresponding to the cord taken for use for connecting the sender to that cord, automatic switches controlled by said sender for extending the test circuit to the subscriber's line, devices associated with the test circuit for testing said line after the connection is established, and means for connecting any of said devices with said cords.

4. In a testing system, in combination, a test set for testing a plurality of lines, automatic switches, a sender, means for associating said sender with a plurality of said switches, means for operating said sender for successively directing said associated switches to connect said test set with a plurality of lines, and means in said test set for simultaneously testing said lines.

5. In a testing system, in combination, a test set for testing a plurality of lines, automatic switches, a sender, means for associating said sender with a plurality of said switches, means for operating said sender for successively directing said associated switches to a plurality of lines, means for automatically and successively associating said lines with said test set in response to the association of said switches with said lines, and means in said test set for simultaneously testing said lines.

6. In a testing system, in combination, a test set for testing lines, automatic switches, a sender, means for associating said sender with a plurality of said switches, means for operating said sender for successively directing said associated switches to connect said test set with a plurality of lines, means in said test set for making different tests on each associated line, and means for alternately making the same tests on each associated line.

7. In a testing system, in combination, a test set for testing a plurality of lines, automatic switches, a sender, a plurality of cord circuits for associating said sender with a plurality of said switches, means for operating said sender for successively directing said associated switches to connect said test set with a plurality of lines, and means in said test set for simultaneously testing said lines.

8. In a testing system, in combination, a test set for testing a plurality of lines, automatic switches, a sender, means for associating said sender with a plurality of said switches, means for operating said sender for successively directing said associated switches to connect said test set with a plurality of lines, a signal, means for flashing said signal to indicate that a switch is under the control of the sender, and means for operating said signal steadily to indicate that the sender has completed said control function.

9. In a testing system, in combination, a test set for testing a plurality of lines, automatic switches, trunk lines, a sender, means for associating said sender with a plurality of said switches, means for operating said sender for successively directing said associated switches to connect said test set over said trunk lines with a plurality of lines, a signal, means for flashing said signal to indicate that a switch is being directed to a line, a second signal, and means for operating said second signal to indicate that all trunks over which said line may be reached are busy.

10. In a wire chief's testing system, two test circuits each terminating in a manual cord and plug and each being provided with keys and associated testing apparatus, and a cord reverse key in each test circuit whereby the two test circuits may be interchanged with respect to said plugs.

11. In a wire chief's testing system, a primary test circuit terminating in a manual cord and plug, keys and a voltmeter associated with said test circuit for making voltmeter tests of subscribers' lines, a secondary test circuit also terminating in a manual cord and plug, keys and other devices associated with said secondary test circuit for making line tests not requiring a voltmeter, and a cord reverse key in each test circuit whereby the two test circuits may be interchanged with respect to said plugs.

12. In a wire chief's testing system, two test circuits each terminating in a manual cord and plug and each being provided with keys and associated testing apparatus, an outgoing test trunk jack and a series of automatic switches whereby either test circuit may be extended into connection with a subscriber's line and a cord reverse key in each test circuit whereby the two test circuits may be interchanged with respect to said plugs.

13. In a wire chief's testing system, a primary test circuit terminating in a manual cord and plug, keys and a voltmeter associated with said test circuit for making voltmeter tests of subscribers' lines, a secondary test circuit also terminating in a manual cord and plug, keys and other devices associated with said secondary test circuit for making line tests not requiring a voltmeter, an outgoing test trunk jack and a series of automatic switches whereby either test circuit may be extended into connection with a subscriber's line, and a cord reverse key in each test circuit whereby the two test circuits may be interchanged with respect to said plugs.

14. In a wire chief's testing system, a test circuit comprising a plurality of keys and associated apparatus for testing subscribers' lines, a series of automatic switches controllable from said testing circuit to connect the same with a subscriber's line, a test wiper in the final switch of said series for testing the line to determine whether it is busy or idle, a test relay controlled over said test wiper, and means controlled by said relay for giving the wire chief a visual busy signal.

In witness whereof, I hereunto subscribe my name this 27th day of December, A. D., 1922.

LEWIS H. JOHNSON.